Aug. 10, 1954     A. I. MIHALAKIS     2,685,818

OPTICAL PROJECTING INSTRUMENT INSTALLATION FOR VEHICLES

Filed July 25, 1951     4 Sheets-Sheet 1

Inventor
AGIS I. MIHALAKIS
By
Bean, Brooks, Buckley & Bean
Attorneys

Aug. 10, 1954 — A. I. MIHALAKIS — 2,685,818
OPTICAL PROJECTING INSTRUMENT INSTALLATION FOR VEHICLES
Filed July 25, 1951 — 4 Sheets-Sheet 4

Inventor
AGIS I. MIHALAKIS
By Bean, Brooks, Buckley & Bean.
Attorneys

Patented Aug. 10, 1954

2,685,818

UNITED STATES PATENT OFFICE 2,685,818

OPTICAL PROJECTING INSTRUMENT INSTALLATION FOR VEHICLES

Agis I. Mihalakis, Buffalo, N. Y., assignor to Glowmeter Corporation, Buffalo, N. Y.

Application July 25, 1951, Serial No. 238,545

18 Claims. (Cl. 88—24)

This invention relates generally to the field of instrumentation, and more particularly to a plural instrument package adapted for installation as a unit.

Present day instrument assemblies, and particularly those used on vehicles, are relatively cumbersome and complex and possess many other disadvantages. Taking the conventional automobile as an illustrative example, a considerable amount of space in the forward passenger compartment is taken up by the instrument panel or dashboard. This dashboard, which is necessary as a mounting member for the various instruments such as a speedometer, an oil pressure gauge, a temperature gauge, and the like which are installed in present day vehicles, not only takes up a considerable amount of room which could well be devoted to other purposes, such as to provide increased leg room, but also makes it extremely difficult to service and repair the various instruments mounted thereon. The space behind the dashboard is extremely crowded, and a multiplicity of instruments and other devices are mounted thereon with their mechanisms and wiring and other connections extending therebehind. Thus it is extremely difficult to reach up behind the dashboard and service a particular instrument.

Not only is the servicing of instruments so mounted rendered difficult, but the original installation thereof is relatively expensive because the instruments and wires must be installed on a special sub-assembly line. Also, a relatively large number of wires, washers, bolts, brackets and the like are required.

Another disadvantage in conventional instrument assemblies lies in the fact that they are arranged to present relatively large dial faces containing the entire range of possible indications or readings, and the observer must scan the entire dial face to determine the actual indication of the instrument. Thus, the observer must actually study the entire instrument panel in order to determine whether his vehicle is operating satisfactorily and at the proper speed.

In addition, such instrument installations are relatively expensive and materially increase the cost of a vehicle when installed thereon.

Therefore, it is an object of the present invention to provide a vehicle instrument installation wherein the instrument mechanisms are located at a point remote from the conventional dashboard area, whereby to free said area for other uses and whereby said mechanisms are easily accessible for repair and replacement.

Another object of the instant invention is to provide a package-type instrument assembly, wherein a plurality of instruments are contained within a housing member which is adapted to be installed as a unit.

A further object of the instant invention is to provide a package-type instrument assembly for vehicles wherein the instruments are contained within a housing member adapted to be detachably secured to the forward side of the conventional vehicle firewall and extend therethrough into the passenger compartment.

A further object of the instant invention is to provide an instrument installation which eliminates entirely the conventional instrument dial face, and substitutes in place thereof an image projection system which projects an image of only the actual instrument indication to a viewing means located either within or adjacent to the normal field of vision of the observer, and which installation includes a warning system as well as an indicating system.

It is also an object of this invention to provide a vehicle instrument installation wherein the instrument mechanisms are housed within the motor compartment so as to be readily accessible for replacement and repair, and wherein means are provided to transmit an image of the actual instrument indications onto a compactly arranged viewing means within the passenger compartment.

Another object of the instant invention is to provide an instrument installation wherein an image of the instrument indication is projected onto a relatively small viewing means, and wherein said image is clearly visible in daylight as well as in darkness.

An additional object of the instant invention is to provide an instrument assembly wherein a plurality of instruments, together with viewing screen means and means projecting an image of each instrument indication onto said viewing screen means, are all enclosed within a single package-type unit which is adapted for installation as such.

A further object of the instant invention is to provide an instrument assembly and installation of the aforementioned type which is relatively inexpensive to manufacture, compact in construction, and completely reliable in operation.

The foregoing and other objects will become apparent upon a perusal of the ensuing detailed description, taken together with the accompanying drawings wherein.

Figure 1:
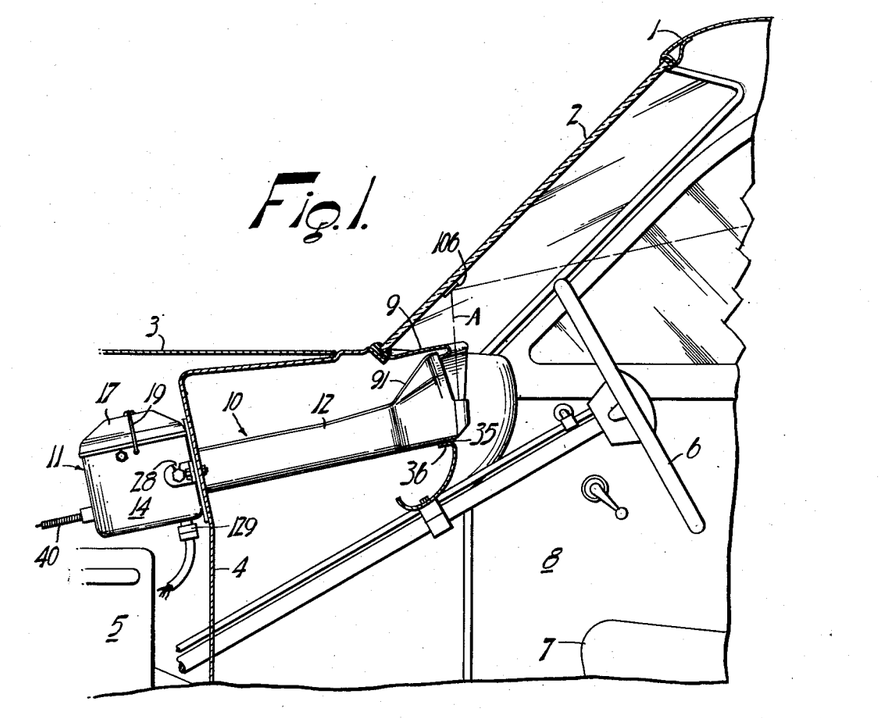
Fig. 1 shows the instrument assembly of the instant invention, with one arrangement of the viewing means thereof, installed in place on a conventional vehicle.

Fig. 1 of the drawings shows the instrument package unit of the instant invention installed in place on a conventional automotive vehicle 1, which vehicle is provided with a windshield 2, a hood 3, a firewall 4 separating the motor compartment from the passenger compartment, an engine block 5, a steering wheel and shaft 6, a seat 7, and a door 8. Vehicle 1 is also provided with a dash board or instrument panel 9, which instrument panel extends downwardly beneath windshield 2. The instrument package unit of the instant invention comprises a single housing member 10 having a box-shaped rearward portion 11 which is mounted on the forward side of firewall 4, and a relatively slender forwardly extending portion 12 which extends through firewall 4 and into instrument panel 9.

Figure 6:
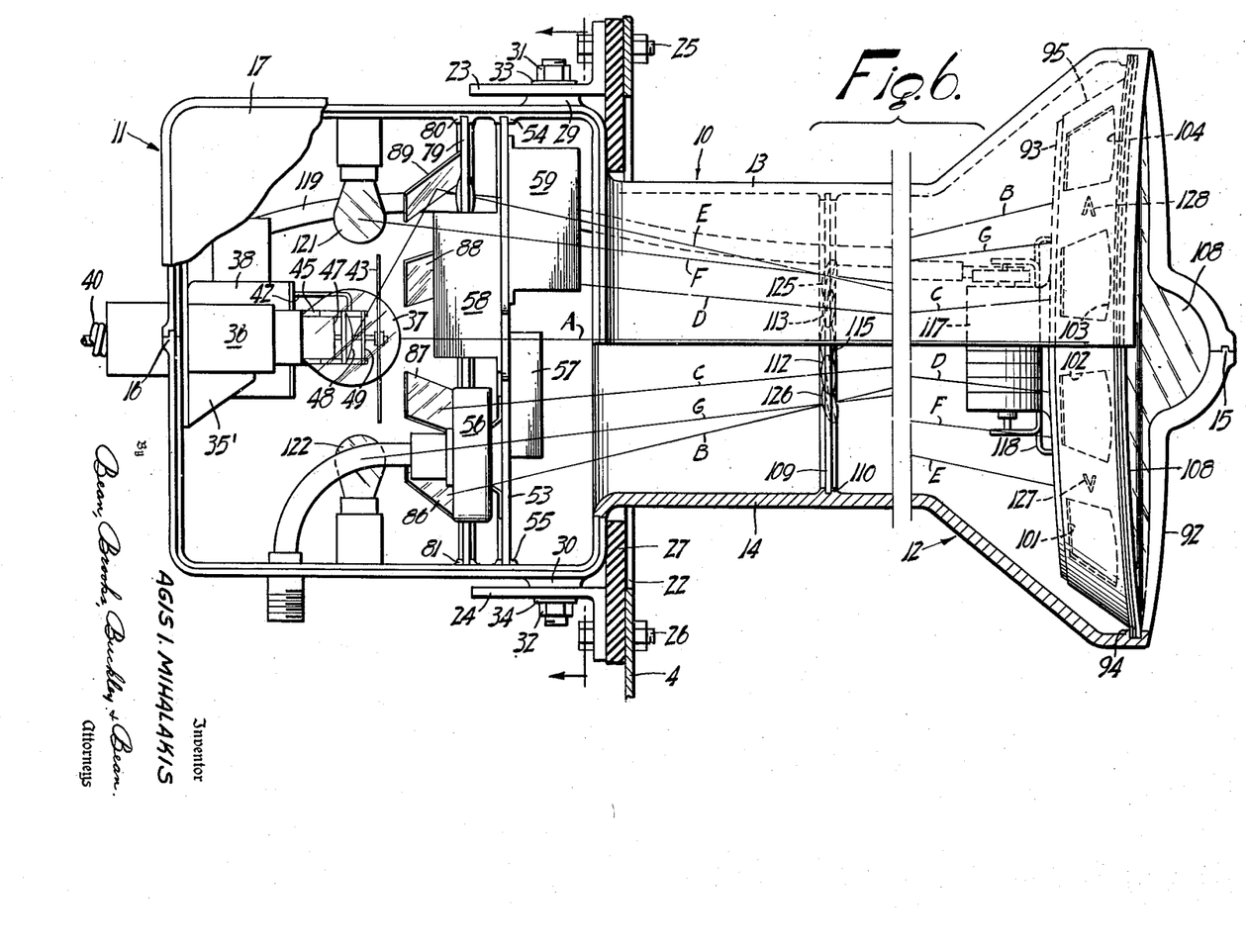
Fig. 6 is a top sectional view, with parts broken away for ease of illustration, of the instrument assembly of Fig. 1.

Housing 10 is made in three parts, being split longitudinally to provide two parts 13 and 14 which are joined together along their edge portions with a tongue and groove connection, as illustrated for example at 15 and 16 in Fig. 6. Box-shaped portion 11 of housing 10 is open on its top side, and a cover member 17 fits thereover, being joined thereto with a tongue and groove connection. A gasket 18 fits between cover member 17 and the two parts 13 and 14 of the housing member 11, to provide a waterproof seal therebetween, and a bail-like member 19 is pivotally secured to the opposite sides of box-shaped portion 11, as at 20, and swings upwardly to engage a plurality of grooved projections 21 carried at the top of cover member 17, whereby the bail member 19 snaps into the grooves of projections 21 to secure cover member 17 in place on box-shaped portion 11. Parts 13 and 14, and cover member 17, may be formed of any suitable material such as metal, plastic, or the like.

Firewall 4 is suitably apertured, as at 22, and housing 10 is adapted to be mounted on said firewall with part 12 extending through said aperture and into instrument panel 9, and with the box-shaped portion 11 being secured to the forward or motor compartment side of firewall 4, all in the following manner. Two cradle-type brackets 23 and 24 are mounted on the forward side of firewall 4, being secured thereto by nut and bolt assemblies 25 and 26, respectively, and with a gasket 27 fitting therebetween. Brackets 23 and 24, in addition to being apertured in their center portions, are slotted at their upper portions, as shown at 28 in Fig. 1, with said slots extending to said center apertures. Each side of housing portion 11 is provided with outwardly projecting mounting ears 29 and 30, which mounting ears are adapted to be received by the slots in mounting brackets 23 and 24, said ears sliding through said slots to rest in the center apertures of said mounting brackets. Nuts 31 and 32 threadedly engage the outer ends of mounting ears 29 and 30 to secure the same in place in mounting brackets 23 and 24, with washers 33 and 34 fitting between nuts 31 and 32 and mounting brackets 23 and 24, respectively.

When it is desired to install the instrument package unit of the instant invention, the forward extension 12 of housing 10 is inserted through aperture 22 of firewall 4 and through an aperture 35 in instrument panel 9, with the forward end of housing portion 12 resting on an inturned flange portion 36 of instrument panel 9. Mounting ears 29 and 30 are then fitted into mounting brackets 23 and 24, being secured therein in the aforesaid manner, and housing 10 is thus installed and secured in position with portion 11 being mounted on the forward or motor side of firewall 4 and with portion 12 extending therethrough and into instrument panel 9. Thus, the instrument assembly of the instant invention is installed through the motor compartment in a manner which is relatively simple as compared to conventional installations.

Housing 10 is arranged to contain all of the instruments usually found in automotive vehicles, with the rear box-shaped portion 11 enclosing the instrument mechanisms, and with portions 11 and 12 jointly containing means for projecting indicating images of the various instrument mechanisms forwardly into the range of vision of the operator of the vehicle, all in the following manner.

A bracket 35' is mounted on the rear wall of housing portion 11, and supports along its upper edge a socket member 36 containing a light source 37. At the lower end of bracket 11 there is mounted a speed-responsive indicating instrument 38. A bushing 39 is fitted within the rear wall of housing portion 11 immediately behind indicating instrument 38, and a conventional cable transmission means 40 extends through said bushing and into said speed-responsive instrument to actuate the same in a conventional manner. Cable 40 extends to a conventional speed-responsive drive means, not illustrated.

Figure 7:
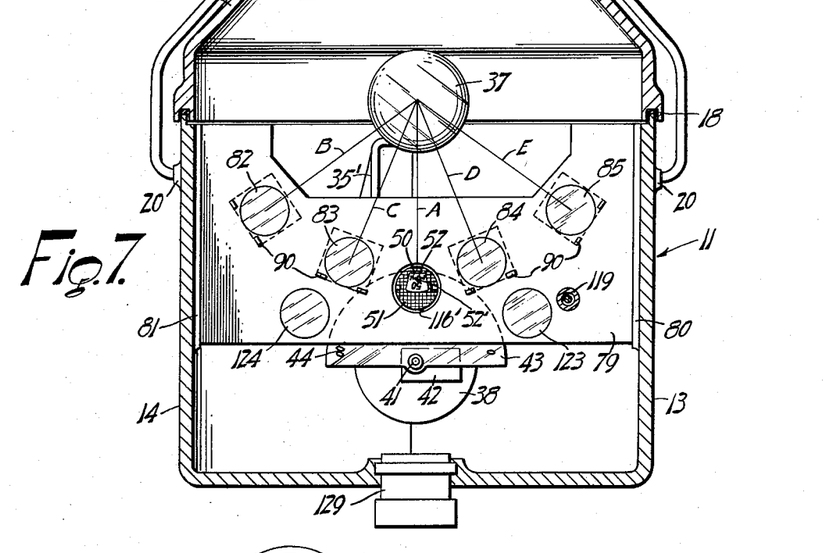
Fig. 7 is a sectional view taken along the line VII—VII of Fig. 3.

A shaft 41 extends forwardly from the casing of instrument 38, being journaled in a bracket member 42, and carries at its outer end, in place of a conventional needle or pointer, a light pervious and preferably transparent member 43 having speed-indicating indicia 44 thereon as shown in Fig. 7. Transparent member 43, which member is in the form of a half circle, is arranged to be rotated in response to variations in the speed of the vehicle, and to indicate the speed of the vehicle in a manner which will become apparent. While member 43 is illustrated as having the form of a half circle, obviously it may be of any desired form.

A bracket member 45 extends forwardly from bracket 35' in a position above instrument 38, and carries or supports, on a downwardly inclined extension 46 thereof, a mirror or other light reflecting surface 47 arranged to intercept rays of light from light source 37 and reflect the same forwardly of housing 10 and through a condensing lens means 48 which is also carried by bracket 45 and which condenses said rays of light through transparent member 43. A masking member 49 is mounted on bracket 45 forwardly of condensing lens means 48. Masking member 49 contains a light pervious portion 50 surrounded by a light impervious portion 51, as shown in Fig. 7, whereby light rays reflected from surface 47 through condensing lens 48 will pass through only the light pervious portion 50 of masking member 49 to illuminate a predetermined portion of transparent member 43. Thus, only that portion of transparent member 43 which is aligned with the light pervious portion 50 of masking member 49 will be illuminated. The light pervious portion 50 of masking member 49 also carries labeling indicia thereon, such as the words M. P. H. shown at 52 in Fig. 7, whereby to provide suitable labeling for the speed indicating instrument assembly. In addition, portion 50 carries a pointer 52', which pointer may instead take the form of a hairline if desired.

Mask 49 can be made of plastic, with the portions surrounding the light pervious portion 50 and the labeling indicia 52 being appropriately blacked out. Or, it could be made of metal with suitable cutout portions, or of glass with appropriate blacked-out portions. Also, it could be made of film, being photographed from a suitable model to provide the appropriate labeling indicia and light pervious portion.

Thus, with the various parts heretofore described appropriately arranged, only the immediate vicinity of the indicia corresponding to the speed of the vehicle will be illuminated. An image of this indicia, together with the labeling indicia, is projected forwardly of housing 10 in a manner to be described.

A plurality of other instruments, such as an ammeter, a temperature gauge, an oil gauge, and a gasoline gauge, are also contained within housing portion 11. For this purpose, a mounting member 53 extends across housing portion 11, being contained with split flange members 54 and 55 at opposite sides of housing portion 11. The various instrument mechanisms comprising an oil gauge 56, an ammeter 57, a temperature gauge 58, and a gasoline gauge 59, are mounted on mounting member 53 by a plurality of screws 60 or other appropriate means, with casings 56 and 58 being mounted on one side of mounting member 53, and casings 57 and 59 being mounted on the opposite side thereof.

Figure 8:
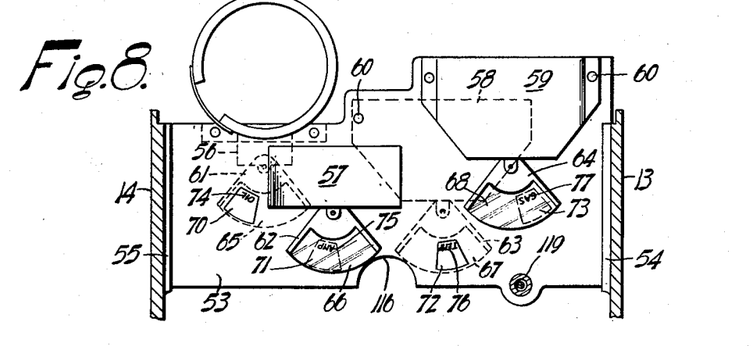
Fig. 8 is a sectional view taken along the line VIII—VIII of Fig. 3.
Figure 9:
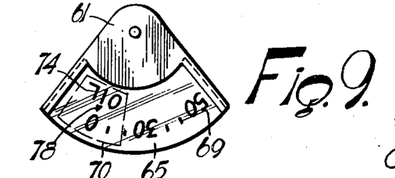
Fig. 9 is a view of one of the indicia-bearing members utilized in the instant invention.

Said instrument mechanisms 56, 57, 58 and 59 are provided with downwardly extending indicating members 61, 62, 63 and 64, respectively, which indicating members are operatively connected to said instrument mechanisms for pivotal movement responsive thereto. Said members include transparent segment-shaped portions 65, 66, 67 and 68, respectively, which segment-shaped portions may be otherwise shaped, if desired, and are provided with appropriate indicating indicia such as is shown at 69 in Fig. 9. Mounting member 53 is provided with cutout portions 70, 71, 72 and 73, which cutout portions are associated with segment-shaped portions 65, 66, 67, and 68, respectively, and which cutout portions are provided with labeling indicia and pointer or mark means as shown at 74, 75, 76, and 77 in Fig. 8 and at 78 in Fig. 9. Therefore, by reason of said cutout portions, only a predetermined area of each of said segment-shaped portions is illuminated, and the parts are arranged so that the illuminated portion includes the indicia corresponding to the actual indication of the associated instrument mechanism. Thus, mounting member 53, by defining only predetermined areas of said segment-shaped portions, is also a masking member. The labeling indicia provides appropriate labeling for the various indicating indicia.

Mounting member 53 may be made of glass or a light-transmitting plastic, or other light-transmitting material, with appropriate portions blacked out, or of metal with appropriate cutout portions. In the latter case, portions 70, 71, 72 and 73 may comprise film with the labeling indicia photographed thereon.

A lens member 79 also extends across housing portion 11, being secured between split flange members 80 and 81 at opposite sides of said housing portion, and said lens member is provided with a plurality of condensing lenses 82, 83, 84 and 85. Preferably, member 79 is molded of a plastic material with said lenses being formed therein. However, said lenses may be formed separately and inserted in member 79. Member 79 supports a plurality of light reflecting members 86, 87, 88 and 89, which reflecting members are secured to member 79 as by means of flanges 90, or the like, and, as is apparent from the drawings, reflecting members 86, 87, 88 and 89 are so mounted with respect to lenses 82, 83, 84 and 85 that they intercept light rays from light source 37 and reflect the same through said respective lens members. Additionally, the associated light reflecting members and lens members are arranged relative to member 53 so that the light rays reflected by member 86 through lens 82 will pass through cutout portion 70, the rays of light reflected by member 87 through lens 83 will pass through cutout portion 71, the light rays intercepted by member 88 and reflected through lens 84 will also pass through cutout portion 72, and the light rays reflected from member 89 through lens 85 will pass through cutout portion 73. In this way, the indicia carried by each of transparent members 65, 66, 67 and 68, and corresponding to the various instrument indications, is illuminated, together with the associated labeling and pointer or marking indicia, to create an image thereof, which images, together with the image of the appropriate speed-indicating indicia of member 43, are projected toward the passenger compartment end of housing member 10. It should be noted that these five separate and distinct images are all created from a single light source 37. While this arrangement possesses certain obvious advantages, a greater number of light sources may of course be used if desired.

As previously described, housing 10 has an elongate portion 12 extending into the area of instrument panel 9. Portion 12 has an upwardly inclined top portion 91 at its forward end, and a lower portion 92 extending beyond the termination of portion 91, in the form of a lip, and inclined upwardly. A viewing screen mounting member 93 is carried by portion 91, being secured within a split flange 94 at the end thereof, and extends downwardly therefrom to provide an inclined surface 95. Member 93 also has a cutout portion 96 for a purpose to be described. Four viewing screen means 97, 98, 99, and 100, which viewing screen means are preferably of the type disclosed in applicant's copending application Serial No. 162,851, filed May 19, 1950 for a Reflecting Screen, are mounted over cutout portions 101, 102, 103, and 104 in the inclined portion 95 of member 93. Each of said screen means comprises an opaque substance the face of which is modified by a plurality of fine parallel grooves and ridges over all portions of which there has been applied a coating of highly light-reflecting material. Preferably, said viewing screen means are formed as a single member mounted to overlie each of said cutout portions. A light reflecting member 105 depends from member 93 and is inclined whereby to intercept certain of the projected images previously referred to and reflect the same onto said viewing screens as will be more completely described subsequently. Also, one viewing screen 106, constructed in the same manner as the other screens previously referred to, is mounted on or near the surface of windshield 2 either adjacent to or within the normal field of vision through the windshield of a person driving the vehicle. A second light-reflecting member 107 is mounted on inclined portion 92 of housing 10 in such a manner as to reflect one of the projected images onto said viewing screen 106. In addition, a light pervious and preferably transparent member 108 fits over the open end of portion 12 of housing 10 to form a dust-proof covering therefor, said member being secured within split flange 94 which extends all around said opening.

If desired in certain installations, translucent screen means can be used in place of the preferred screen means described above, in which case the screen means would be mounted and the image projecting means arranged so that the images would be projected through the screen means.

Figures 3, 4, 5:
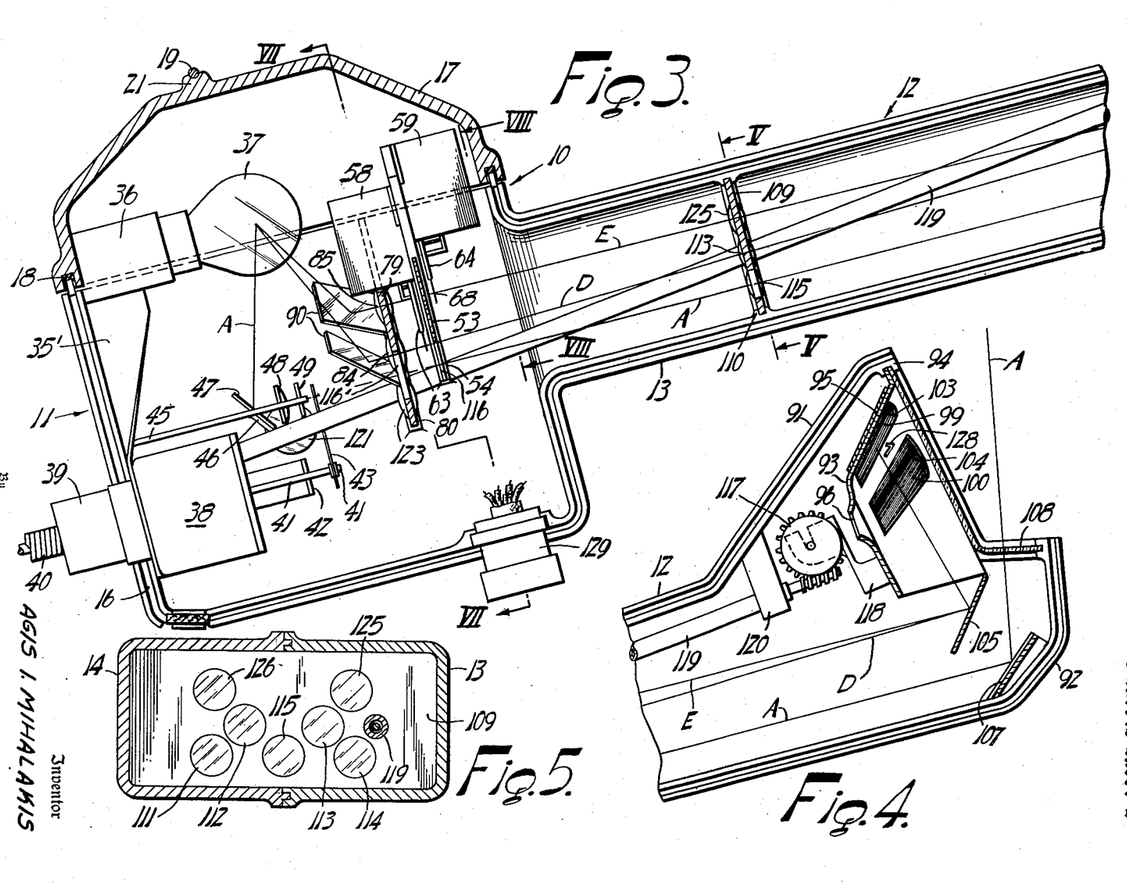
Fig. 3 is a sectional view, with parts broken away for ease of illustration, of the rearward end of the instrument assembly of Fig. 1.
Fig. 4 is a sectional view, with parts broken away for ease of illustration, of the forward end of the instrument assembly of Fig. 1.
Fig. 5 is a view taken along line V—V of Fig. 3, and showing the novel objective lens arrangement of the instant invention.

Intermediate the ends of portion 12 of housing 10, a second lens mounting member 109 is mounted within a split flange 110, and said lens mounting member contains a plurality of objective lenses including objective lenses 111, 112, 113, 114 and 115, as shown in Fig. 5. Preferably, member 109 and lenses 111, 112, 113, 114 and 115, as in the case of lens member 79, are formed as an integral unit, being molded from a plastic material, whereby to provide a relatively simple and inexpensive lens system, but other methods of making the same can be used. These objective lenses are arranged so they will focus the various images on the various viewing screens. Thus, the indicia image of member 65 and the appropriate labeling indicia is projected forwardly through objective lens 111 onto reflecting member 105 and viewing screen 100, being focused on the latter. The image of the appropriate indicia reading of member 66 and labeling indicia 75 is projected through lens 112 and reflected by member 105 onto viewing screen 99. The indicating image of member 67 and its accompanying labeling indicia is focused by lens 113 onto viewing screen 98, being reflected by member 105, and the indicia image of transparency 68 is focused by lens 114 onto viewing screen 97, being reflected thereon by member 105. Thus, the four viewing screens 97, 98, 99 and 100 reflect the indicating images of the four instruments 59, 58, 57 and 56, presenting the indication of each of these instruments at a location where they can be easily read by the driver of the vehicle.

At the same time, an image of the appropriate speed-indicating indicia on member 43 and labeling indicia 52 is projected through lens 115 and focused thereby on viewing screen 106, being reflected upwardly by member 107, whereby the exact speed indication is projected either adjacent to or into the field of vision of the driver, enabling him to know his exact speed at all times without having to shift his eyes from the road ahead of the vehicle. It will be noted that mounting member 53 is cut away along its bottom edge as at 116, and member 79 has a cutout portion 116' in line with the illuminated portion of member 43, whereby to permit passage of the projected speed-indicating image which would otherwise be blocked by said members.

It will be appreciated that the five indicating images presented in this manner add greatly to the convenience of the driver and to his safe driving. He knows his exact speed at all times, and only the actual instrument indications are shown on the various viewing screens whereby it is not necessary for the driver to scrutinize and study a series of relatively large dial faces. Furthermore, by reason of applicant's novel system of instrument presentation, and particularly the structure and configuration of the various viewing screen means, the various projected images are clearly readable in daylight as well as in darkness. Also, a warning system is combined with this indicating system in a manner to be described.

Figure 10:
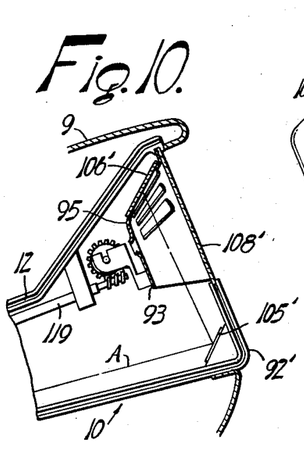
Fig. 10 is a fragmentary sectional view corresponding to the forward end of the instrument assembly of Fig. 1 but showing a modified arrangement of the viewing means.

As an alternative arrangement, the modification shown in Fig. 10 can be used in which modification all parts remain the same except that all five viewing screen means, corresponding to viewing screen means 97, 98, 99, 100 and 106, are mounted on the inclined portion 95 of member 93, with viewing screen means 106' being carried by said portion 95 instead of on or adjacent the windshield 2 as shown in Fig. 1. If desired, all five viewing screen means can be formed as a single screen member arranged to extend over five appropriate cutout portions in portion 95. A single light-reflecting member 105' is mounted on the lower forward portion 92' of portion 12 of housing 10, and this light-reflecting member 105' reflects all five of the projected images onto the various viewing screen means. With the arrangement shown in this modification, all of the images appear on screen means carried by housing 10, and there is no screen which must be installed separate therefrom. The open end of portion 12 is covered by a transparency 108' whereby housing 10 is rendered dust-proof.

It will be noted that each of the various viewing screen means utilized in the instant invention is inclined relative to the line of vision of the vehicle operator and to the line of image projection, whereby the projected light rays, following the rule that angle of reflection equals angle of incidence, are reflected by the various viewing screen means into the field of vision of the observer. Also, the reflecting surface of said screens faces downwardly over a relatively non-reflecting area, to eliminate as much as possible any reflection thereon of extraneous light. Also, the grooves and ridges of the screens are generally vertically aligned to prevent sidewise interference from extraneous light.

Figure 2:
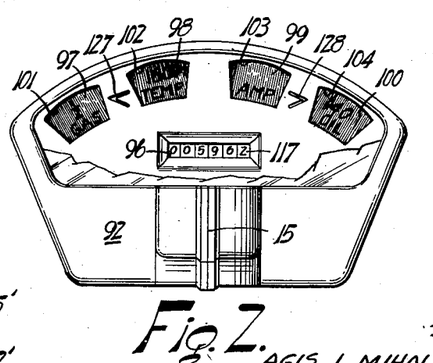
Fig. 2 is a view of the front face of the instrument assembly of Fig. 1, showing certain of the viewing means.

In addition to providing a novel instrument arrangement and assembly as disclosed hereinabove, the package unit of the instant invention also contains an odometer and right and left-hand turn indicators. Thus, a more or less conventional odometer arrangement 117 is carried by a bracket 118 on member 93 with the face of odometer 117 being visible through cutout portion 96 of member 93 as shown in Fig. 2. A drive cable 119 extends through housing 10, being driven in a conventional manner, and extends through members 79, 53 and 109, and a bracket 120 secured on portion 91 of housing 10, to drive odometer 117 in a conventional manner.

Also, portion 11 of housing 10 contains two light sources 121 and 122 arranged to be intermittently actuated to indicate either a left-hand or a right-hand turning signal, respectively. Member 79 carries two lenses 123 and 124 arranged in the path of light sources 121 and 122, respectively, and member 109 is similarly provided with a pair of lenses 125 and 126, whereby rays of light from said light sources are projected forwardly through housing 10. These projected light rays pass through arrow-shaped cutout portions 127 and 128, respectively, on member 93, whereby the blinking light source actuated in a conventional manner in response to a turning signal will illuminate the appropriate cutout portion 127 or 128.

The various necessary electrical cables required by the instrument mechanisms and light sources, and not previously provided for, are carried into portion 11 of housing 10 through an appropriate electrical connection receptacle 129. The details of the various energizing connections are not specifically illustrated, since various conventional energizing arrangements can be utilized and the details thereof form no part of the instant invention.

To summarize the overall operation of the instrument presentation system of this invention, it would perhaps be well to completely trace through the path of each of the various light beams and projected images, and these paths are shown in the drawings by means of letters.

Thus, certain of the light rays from light source 37 follow the path indicated at A to member 47 where they are reflected through condensing lens 48 and masking member 49 to illuminate the exact speed-indicating indicia carried by member 43. An image of the indicia thus illuminated is projected along path A through the cut-out portion 116' of member 79 and the cutout portion 116 of member 53 and projecting lens 115, which projecting lens focuses said image on viewing screen 106, said image being intercepted and reflected onto said screen by member 107.

Other light rays from light source 37 follow path B to reflecting member 86 which reflects them through condensing lens 82, member 65, and cutout 70 to illuminate the proper indicia on member 65. The image of this illuminated indicia follows path B through objective lens 111, which lens focuses said image onto screen 100 via reflecting member 105.

Other light rays follow path C to reflecting member 87 which reflects them through condensing lens 83 and cutout portion 71 to illuminate the appropriate indicia on member 66. This image is projected along path C through lens 112 which focuses it onto screen 99, said image being intercepted and reflected upwardly by member 105.

Similarly, certain light rays follow path D to reflecting member 88 which reflects them through lens 84, member 67, and cutout 72, and an image of the illuminated portion of the indicia on member 67 is projected forwardly along path D through objective lens 113 which focuses said image on screen 98 via reflecting member 105.

Other light rays follow path E to reflecting member 89 which reflects them through condensing lens 85 and cutout 73 to illuminate the indicia on member 68. An image of this illuminated indicia is projected along path E through objective lens 114 and onto member 105 and screen means 97, being focused on the latter by said objective lens.

The odometer 117 is energized in a conventional manner to provide a mileage register, and light rays from light source 121 follow path F through lenses 123 and 125 to cutout 127, while light rays from light source 122 follow path G through lenses 124 and 126 to cutout 128. Also, if desired, a conventional hi-lo headlight beam indicator could be installed in housing 10, being operable in the same manner as the turn indicators to illuminate a cutout portion in member 93.

An additional feature of the instant invention lies in the fact that variations in color are utilized to give warning of a change in an instrument indication. Thus, for example, each of members 65, 66, 67 and 68 are provided with a series of different colors, such as red, blue, and yellow, extending over different portions of the indicia-bearing extent thereof. Member 43 is similarly provided with a series of different colors, being repeated if necessary. In this way, the passage of any instrument indication from one range to another is indicated not only by a change in indicia but also by a change in color, thus providing, in effect, a combined warning and indicating system presenting many advantages over conventional instrument installations.

This color system is particularly effective when the same color is used over the optimum range of each instrument as described in detail and claimed in its broader aspects in my copending application Ser. No. 216,647 filed March 20, 1951. Then, as long as each instrument is functioning to indicate an optimum condition, all of the images appearing on the screen means will be of the same color. If one of the instrument indications varies from the predetermined optimum, the corresponding image will change color, and the operator will immediately be warned, not only that one instrument is indicating a malfunctioning, but also which instrument it is, all without the necessity of scanning and observing a plurality of instrument dials.

Of course, different colors, as well as different methods of coloration, can be utilized. Thus, the indicia may be either opaque or light-pervious, with the remainder of the indicia-bearing members being either light-pervious or opaque, respectively. Also, either the light-pervious portions of the indicia-bearing member can be colored, or the masking members can be provided with colored light pervious elements across their cutout portions, or other coloring means can be provided. If desired, the rays of light can be passed through members of different colors to produce an image of still another color.

Therefore it is seen that the instant invention fully accomplishes its aforesaid purposes. All of the various indicating and registering instruments carried as standard equipment on most present day vehicles, including turn indicators, are contained within a housing which extends as a unit from the forward side of a vehicle firewall to the dashboard area thereof. In installing said unit, it is only necessary to fit the same through the opening in the firewall, from the forward side thereof, and fasten the same to said firewall. In removing said unit for replacement and repair purposes it is only necessary to reach into the motor compartment and unfasten the unit, and then lift the same bodily outward through the opening in the firewall. The advantages of such an arrangement are obvious in that it reduces to a minimum the amount of passenger compartment space occupied by the instrument system and materially reduces the amount of work required in installing and repairing the instrument assembly. Also, the various instrument mechanisms are rendered accessible for repair purposes simply by removing the cover on that portion of the housing which is within the motor compartment. Thus, virtually all manipulations of the instrument installation of the instant invention are done either in or through the motor compartment.

In addition, the instruments of the present invention are of a type which greatly facilitate reading thereof since the portion which is viewed comprises an image of only the actual instrument indication, which image is projected onto one of several small screen means located either adjacent to or within the driver's normal field of vision, and said screen means occupy relatively little room compared to conventional instrument dials. Also, variations in the color of said images are effectively utilized to provide a warning of a change in instrument indication. Thus, the instant invention provides a combined warning and indicating system. Further, the instrument assembly of the instant invention is relatively inexpensive to manufacture and install.

Of course, the instant invention is not to be limited to the exact structural details disclosed and illustrated, since it is susceptible of many modifications thereof, nor is it to be limited to a vehicle installation, since it is adapted for use in virtually any instrument installation. Therefore, it is intended that the instant invention be limited solely by the scope of the appended claims.

Having completely disclosed the instant invention, and having fully described the mode of operation thereof, what is claimed as new is at follows:

1. In a vehicle having a wall portion separating the motor compartment from the passenger compartment thereof, an instrument installation comprising indicating instrument means operatively connected to a functioning element of said vehicle and located forwardly of said wall portion within said motor compartment, viewing screen means located rearwardly of said wall portion within said passenger compartment in a position to be readily viewed by the vehicle operator, said instrument means having an indicia member, objective lens means interposed between said indicia member and said screen means and focusing the indicia on the latter, and a light source operatively aligned with said indicia member and said objective lens means, whereby an image of said indicia member is projected onto said screen means.

2. In a vehicle having a downwardly extending firewall dividing the same into a motor compartment and a passenger compartment, condition-responsive instrument means operatively connected to a functioning element of the vehicle and mounted on the forward side of said firewall within said motor compartment, said instrument means having a movable light-transmitting indicia-bearing member, opaque viewing screen means located rearwardly of said firewall within said passenger compartment in a position to be readily viewed by the vehicle operator, objective lens means interposed between said indicia-bearing member and said screen means and focusing the indicia on the latter, and a source of illumination operatively aligned with said indicia-bearing member and said objective lens means, whereby an image of said indicia-bearing member is projected onto said screen means.

3. In combination with a vehicle having a firewall extending between the motor compartment and the passenger compartment thereof to separate the same, an instrument assembly comprising condition-responsive instrument means responsive to a functioning element of the vehicle and located on one side of said firewall within said motor compartment, viewing screen means located on the other side of said firewall within said passenger compartment and positioned so as to be easily viewed by the driver of said vehicle, said instrument means having a movable light-transmitting indicia member, objective lens means interposed between said indicia member and said screen means and focusing the indicia on the latter, and a light source operatively alined with said indicia member and said objective lens means, whereby an image of said indicia is projected onto said screen means.

4. In a vehicle having a windshield and a wall member extending downwardly forward of said windshield to separate said vehicle into a motor compartment and a passenger compartment, an indicating instrument means operatively connected to a functioning element of the vehicle and carried on the motor compartment side of said wall member, said instrument means including a movable indicia-bearing member, viewing screen means located in the passenger compartment adjacent the vehicle operator's line of vision through said windshield, illuminating means operatively alined with said indicia-bearing member, and objective lens means interposed between said indicia-bearing member and said viewing screen means and focused upon the latter, whereby an image of said indicia-bearing member will be projected onto said viewing screen means.

5. In a vehicle having a wall element separating its motor compartment from its passenger compartment and having an opening therethrough, an instrument assembly comprising a housing member mounted on the motor compartment side of said wall element and extending through said opening into said passenger compartment, said housing member extending on opposite sides of said wall element and being detachably mounted on said wall element whereby to facilitate the installation and removal thereof as a unit, indicating instrument means adapted for operative connection to a functioning element of the vehicle carried within that portion of said housing member which is located on the motor compartment side of said wall element, viewing screen means carried by said housing member adjacent the end thereof which is within said passenger compartment, said instrument means having a movable indicia member within said housing member, objective lens means within said housing member interposed between said indicia member and said screen means and focusing the indicia on the latter, and a light source within said housing member operatively alined with said indicia member and said objective lens means, whereby an image of said indicia is projected onto said screen means.

6. In a vehicle having a passenger compartment defined at least in part by a wall element, means defining an aperture in said wall element, a housing member, means detachably mounting said housing member on said one of said wall elements exteriorly of said passenger compartment with a portion thereof extending through said aperture and into said passenger compartment, indicating instrument means carried within said housing member exteriorly of said passenger compartment for operative connection to a functioning element of the vehicle, viewing screen means carried by said housing member adjacent the end thereof within said passenger compartment, said instrument means having a movable indicia member within said housing member, objective lens means within said housing member interposed between said indicia member and said screen means and focusing the indicia on the latter, and a light source within said housing member operatively alined with said indicia member and said objective lens means, whereby an image of said indicia is projected onto said screen means.

7. In a vehicle having a motor compartment and a passenger compartment with a wall member extending therebetween to define the same, a housing detachably mounted on the motor compartment side of said wall member and extending therethrough into said passenger compartment, a plurality of condition-responsive indicating instrument means carried within that portion of said housing which is within said motor compartment, viewing screen means carried by said housing adjacent the end thereof which is within said passenger compartment, moveable light-transmitting indicia members within said housing operatively connected to each of said instrument means, each of said indicia members having differently colored portions, means including objective lens means within said housing interposed between said indicia members and said screen means and focusing the indicia on said screen means, and illuminating means within said housing operatively alined with said indicia members and said objective lens means, whereby an image of each of said indicia members is projected on said viewing screen means, said indicia members having portions of a predetermined color serving to indicate an optimum condition, whereby all of said images will be of said predetermined color when all of said instrument means are indicating an optimum condition.

8. In combination with a vehicle having a motor compartment and a passenger compartment and a wall element serving to separate the same, a housing member carried by said wall element and extending into said motor and passenger compartments, condition-responsive indicating instrument means carried within the motor compartment end of said housing member and having a movable light-transmitting indicia member, a labeling indicia member associated with said movable indicia member, viewing screen means carried by said housing member adjacent the end thereof within said passenger compartment in a position to be viewed by the vehicle operator, and means including objective lens means within said housing member interposed between said movable indicia member and said screen means and focusing the indicia on the latter, and a light source within said housing member operatively aligned with said indicia members and said objective lens means, whereby an image of the indicia is projected onto said screen means.

9. An instrument assembly comprising a housing member, a plurality of indicating instrument means mounted within said housing member and each having a moveable indicia-bearing light-pervious member, viewing screen means carried by said housing member and visible exteriorly thereof, objective lens means within said housing member interposed between said indicia-bearing members and said viewing screen means and focusing the indicia upon the latter, and illuminating means arranged in operative alinement with said indicia-bearing members and said objective lens means, whereby an image of said indicia-bearing members is projected on said viewing screen means, said objective lens means comprising a unitary member formed with a plurality of objective lenses therein.

10. In combination with a vehicle having a windshield area and a fire wall extending downwardly forwardly thereof, opaque reflecting screen means positioned adjacent said windshield area, said screen means being inclined toward the vehicle opertaor with the reflecting surface thereof facing the area therebeneath, a housing member carried by said fire wall and extending substantially laterally beneath said windshield area, condition-responsive instrument means carried within said housing member, moveable indicia-bearing means operatively connected to said instrument means and carried within said housing member, a light source within said housing member in operative alinement with said indicia-bearing means, said housing member being enclosed and opaque except for a light-transmitting wall portion alined with the reflecting surface of said screen means, light-reflecting means carried by said housing member and arranged to reflect an image of said illuminated indicia-bearing means through said light-transmitting wall portion and onto the reflecting surface of said screen means, and objective lens means carried within said housing member and interposed between said light-reflecting means and said indicia-bearing means and arranged to focus an image of said indicia-bearing means on the reflecting surface of said screen means.

11. An instrument assembly comprising a housing member, a plurality of condition-responsive indicating instrument means carried within said housing member, a plurality of moveable indicia light-transmitting members operatively connected to said instrument means, viewing screen means carried by said housing member at a point spaced from said indicia members, objective lens means interposed between said indicia members and said viewing screen means and focused upon the latter, illuminating means within said housing member and arranged in operative alinement with said indicia members and said objective lens means, whereby an indicia image of each of said indicia members will appear on said viewing screen means, and masking means blocking out all but a restricted portion of each of said indicia members whereby only the actual instrument indications will appear on said viewing screen means, said masking means comprising an opaque panel member mounting said instrument means and having a light-pervious portion alined with each of said indicia members.

12. An instrument package unit comprising a housing member, a plurality of indicating instrument means mounted within said housing member and each having a moveable indicia-bearing member operatively connected thereto, viewing screen means carried by said housing member, objective lens means carried within said housing member between said indicia-bearing members and said viewing screen means and focusing the indicia upon the latter, illuminating means carried within said housing member, and condensing means arranged to condense light rays from said illuminating means onto said indicia-bearing members, whereby an image of said indicia-bearing members will be projected onto said viewing screen means, said condensing means comprising a unitary member having a plurality of condenser lens means formed therein.

13. An instrument package unit comprising a casing, a plurality of condition-responsive instrument means mounted within said casing, a moveable light transmitting indicia-bearing member operatively associated with each of said instrument means positioned in said casing, viewing screen means carried by said casing, objective lens means within said casing interposed between said indicia-bearing members and said viewing screen means and focusing the indicia upon the latter, a light source mounted within said casing, and a light reflecting member in operative alinement with each of said indicia-bearing members and said light source and objective lens means and arranged to reflect light rays from said light source through said indicia-bearing members, whereby an image of each of said indicia-bearing members is projected onto said viewing screen means.

14. In combination with a vehicle having a wall element separating the motor compartment from the passenger compartment thereof, means defining an opening in said wall element, an instrument assembly comprising a housing member, means detachably mounting said housing member on the motor compartment side of said wall element with a portion thereof extending through said opening and into said passenger compartment, indicating instrument means carried within the motor compartment end of said housing member for connection to a functioning element of said vehicle, a light-transmitting indicia member carried by said housing member and operatively associated with said instrument means, viewing screen means carried adjacent the passenger compartment end of said housing member in a position to be readily viewed from said passenger compartment, objective lens means within said housing member interposed between said indicia member and said screen means and focusing the indicia on the latter, and illuminating means within said housing member operatively alined with said indicia member and said objective lens means, whereby an image of the indicia will be projected on said screen means, said indicia member being provided with portions of different colors whereby a change in the color of said image will warn of a change in the instrument indication.

15. An instrument package unit adapted for use on vehicles comprising a housing member adapted to be detachably mounted on a vehicle, a plurality of indicating instrument means all contained within said housing member and adapted for connection to a functioning element of the vehicle, moveable indicia-bearing members associated with each of said instrument means, viewing screen means carried adjacent one end of said housing member, objective lens means within said housing member interposed between said indicia-bearing members and said screen means and focusing the indicia on the latter, a light source operatively alined with each of said indicia-bearing members and said objective lens means, whereby an image of said indicia will be projected on said screen means, additional light sources carried within said housing member and adapted for connection to switch means on the vehicle, an indicia means in said one end of said housing member adapted to be illuminated by said additional light sources.

16. The combination as set forth in claim 6, wherein the portion of said housing member which is exterior of said passenger compartment has a removable wall portion whereby to facilitate replacement and repair of said instrument means.

17. In combination with a vehicle having a wall element separating the same into a motor compartment and a passenger compartment and a windshield with a dashboard extending downwardly therefrom into said passenger compartment, means providing an aperture in said wall element and in said dashboard, an elongate housing member detachably mounted on the motor compartment side of said wall element and extending through said apertures to terminate at said dashboard, viewing screen means carried by said housing member adjacent the end thereof within said passenger compartment, indicating instrument means carried within the motor compartment end of said housing member and arranged for operative connection to a functioning element of said vehicle, said instrument means having a moveable indicia-bearing member, means including objective lens means within said housing member interposed between said indicia-bearing member and said screen means and focusing the indicia on the latter, and illuminating means within said housing member operatively alined with said indicia-bearing member and said objective lens means, whereby an image of said indicia is projected on said screen means.

18. The combination as set forth in claim 5, wherein said housing member is slip-fitted into brackets mounted on the motor compartment side of said wall element, and means are provided for detachably securing the same therein.

References Cited in the file of this patent

UNITED STATES PATENTS

| Number | Name | Date |
| --- | --- | --- |
| 1,757,493 | Wharam | May 6, 1930 |
| 1,871,877 | Buckman | Aug. 16, 1932 |
| 2,019,234 | Nistri | Oct. 29, 1935 |
| 2,178,637 | Link | Nov. 7, 1939 |
| 2,191,045 | Slayton | Feb. 20, 1940 |
| 2,264,044 | Lee | Nov. 25, 1941 |
| 2,426,184 | Deloraine et al. | Aug. 26, 1947 |
| 2,537,996 | Hankes | Jan. 16, 1951 |
| 2,579,806 | Dvorkin | Dec. 25, 1951 |